(12) United States Patent
Jogand-Coulomb et al.

(10) Patent No.: US 8,452,934 B2
(45) Date of Patent: May 28, 2013

(54) CONTROLLED DATA ACCESS TO NON-VOLATILE MEMORY

(75) Inventors: Fabrice Jogand-Coulomb, San Carlos, CA (US); Robert Chang, Danville, CA (US); Po Yuan, Milpitas, CA (US); Mei Yan, Cupertino, CA (US); Xian Jun Liu, San Jose, CA (US)

(73) Assignee: Sandisk Technologies Inc., Plano, TX (US)

( * ) Notice: Subject to any disclaimer, the term of this patent is extended or adjusted under 35 U.S.C. 154(b) by 1197 days.

(21) Appl. No.: 12/336,445

(22) Filed: Dec. 16, 2008

(65) Prior Publication Data

US 2010/0153672 A1 Jun. 17, 2010

(51) Int. Cl.
*G06F 12/00* (2006.01)

(52) U.S. Cl.
USPC .... 711/163; 711/103; 711/102; 711/E12.101; 711/E12.102; 726/26; 726/27

(58) Field of Classification Search
None
See application file for complete search history.

(56) References Cited

U.S. PATENT DOCUMENTS

| | | | |
|---|---|---|---|
| 6,721,843 B1 | 4/2004 | Estakhri | |
| 6,789,192 B2 | 9/2004 | Hirota et al. | |
| 6,795,264 B2 | 9/2004 | Wilson | |
| 7,111,140 B2 | 9/2006 | Estakhri et al. | |
| 7,203,808 B2 | 4/2007 | Rothman et al. | |
| 2003/0017822 A1* | 1/2003 | Kissner et al. | 455/411 |
| 2003/0221103 A1* | 11/2003 | Hirota et al. | 713/172 |
| 2005/0270855 A1 | 12/2005 | Earhart et al. | |
| 2006/0129819 A1 | 6/2006 | Hirota et al. | |
| 2006/0143417 A1 | 6/2006 | Poisner et al. | |
| 2006/0149899 A1 | 7/2006 | Zimmer et al. | |
| 2006/0161725 A1 | 7/2006 | Lee et al. | |
| 2006/0190510 A1 | 8/2006 | Gabryjelski et al. | |
| 2007/0054655 A1* | 3/2007 | Fantini et al. | 455/411 |
| 2007/0094470 A1 | 4/2007 | Haustein et al. | |
| 2007/0126562 A1* | 6/2007 | Ku | 340/426.28 |
| 2007/0143555 A1 | 6/2007 | Nemiroff et al. | |
| 2007/0168292 A1 | 7/2007 | Jogand-Coulomb et al. | |
| 2007/0168396 A1 | 7/2007 | Adams et al. | |
| 2007/0180210 A1 | 8/2007 | Thibadeau | |
| 2007/0192828 A1 | 8/2007 | Messina et al. | |
| 2007/0266063 A1 | 11/2007 | Camiel | |
| 2008/0046997 A1 | 2/2008 | Wang | |
| 2008/0189557 A1* | 8/2008 | Pipitone et al. | 713/193 |
| 2009/0100480 A1* | 4/2009 | McQuaide, Jr. | 725/100 |

OTHER PUBLICATIONS

Partial International Search Report of International Application No. PCT/US2009/063281, dated Feb. 2, 2010, 6 pages.
International Search Report and Written Opinion received in corresponding PCT Application No. PCT/US2009/063281 from the International Searching Authority (EPO) mailed Apr. 8, 2010, 16 pages.

* cited by examiner

*Primary Examiner* — Reginald Bragdon
*Assistant Examiner* — Arvind Talukdar
(74) *Attorney, Agent, or Firm* — Toler Law Group, PC

(57) ABSTRACT

A method of controlling data access to non-volatile memory is disclosed. The method includes storing a data file in a non-volatile memory. The non-volatile memory includes a memory array including a plurality of address ranges one or more of which corresponding to a protected portion of the memory array and one or more of which corresponding to an unprotected portion of the memory array. The method also includes communicating to a host device an indication that a memory request with respect to the protected portion of the memory array is denied. The indication is communicated for instructing the host device to avoid a timeout when the memory request is denied.

27 Claims, 6 Drawing Sheets

CONTROLLED DATA ACCESS TO NON-VOLATILE MEMORY

FIELD OF THE DISCLOSURE

The present disclosure is generally related to controlling data access to non-volatile memory.

BACKGROUND

Non-volatile memory devices, such as universal serial bus (USB) flash memory devices, have allowed for increased portability of data and software applications. An increasing number of electronic devices, such as consumer electronic devices, are adapted to interact with non-volatile memory devices. In some circumstances it may be desired to control access to data stored in non-volatile memory devices, such as to enforce a security policy or a distribution policy regarding the data. One previous approach to controlling access to data stored at the memory device is to lock the memory device. Other approaches have included cryptography or protection mechanisms such as digital rights management to control access to the data stored at the storage device. However, in current implementations these approaches have not always addressed all security issues thus requiring further improvements.

SUMMARY

In view of the forgoing and related issues, systems and methods to control data access to a non-volatile memory are disclosed. The non-volatile memory includes a memory array including a plurality of address ranges one or more of which correspond to a protected portion of the memory array and one or more of which correspond to an unprotected portion of the memory array. An indication that a memory request with respect to the protected portion of the memory array is denied may be communicated to a host device. The indication is communicated to instruct the host device to avoid a timeout when the memory request is denied.

DETAILED DESCRIPTION

Figure 1:
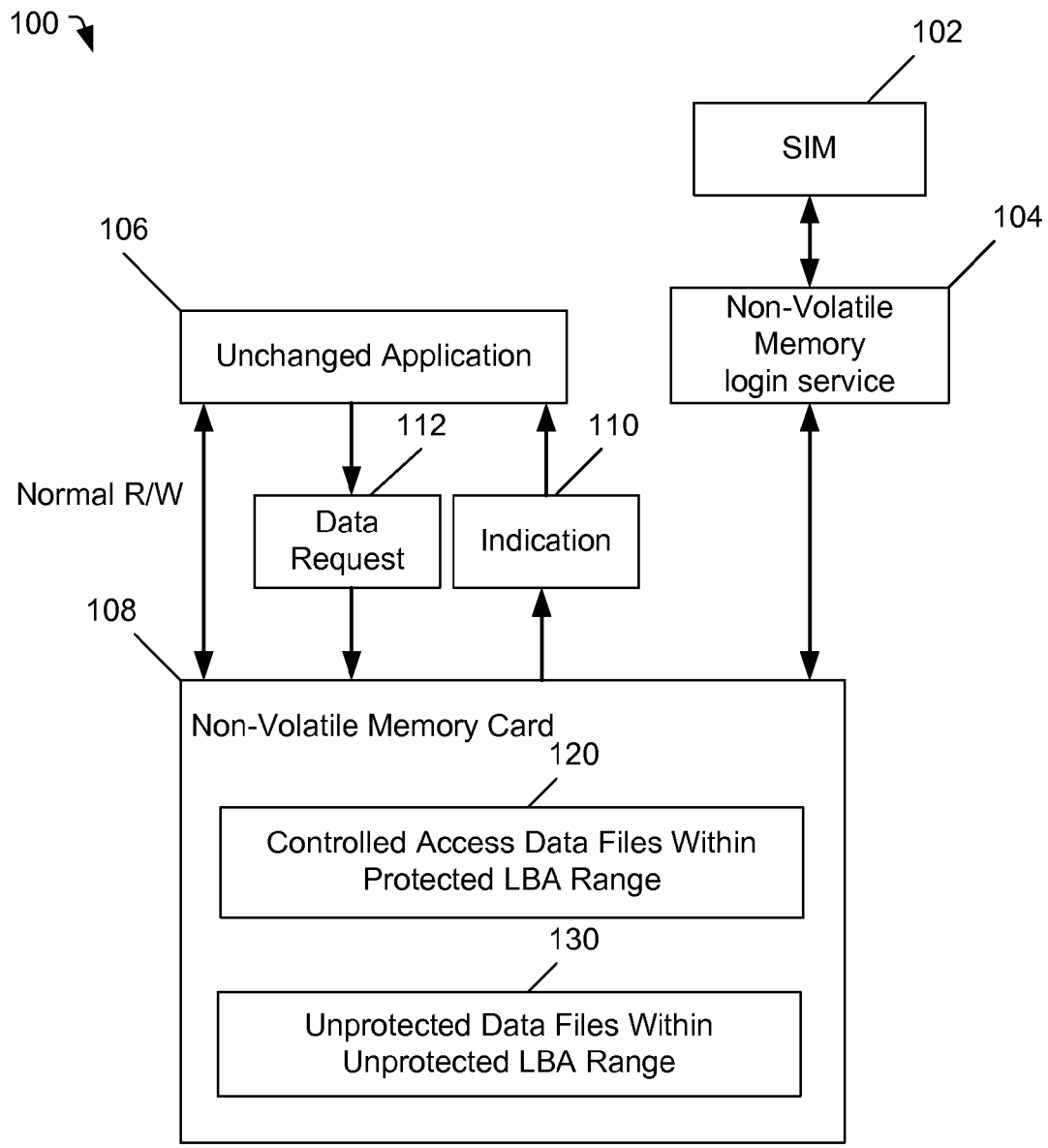
FIG. 1 is a block diagram of a particular embodiment of a system to control data access to a non-volatile memory device.

Referring to FIG. 1, a system including a non-volatile data storage device is depicted and generally designated 100. The system 100 includes a subscriber identity module (SIM) 102, a login service 104 for the non-volatile memory, and an application 106 in communication with a non-volatile memory card 108. The non-volatile memory card 108 includes a set of controlled access data files 120 within a protected address range, such as a protected logical block address (LBA) range, and a set of unprotected data files 130 within an unprotected address range.

In a particular embodiment, the non-volatile memory card 108 is configured to enable normal read and write operation to the unprotected address range, including read and write access to the set of unprotected data files 130. Normal read and write operations to the unprotected LBA range can be made without requiring modifications to conventional memory access applications, illustrated as the unchanged application 106 in FIG. 1. Access to the set of controlled access data files 120 within the protected LBA range is controlled by logic or other circuitry implemented within the non-volatile memory card 108. Controlling access within the protected LBA range enables storage of generally accessible data and also protected content such as enabling a sector range or byte range of generally protected preloaded content, without incurring an expense or performance burden associated with cryptographic or other protection systems.

As illustrated, the login service 104 for the non-volatile memory may communicate with the SIM 102 to obtain credentials or other authentication information from the SIM 102. For example, the non-volatile memory login service 104 may be implemented as a TrustedFlash® login mechanism (TrustedFlash is a registered trademark of SanDisk Corporation). The non-volatile memory login service 104 may be adapted to provide authentication information to the non-volatile memory card 108 to request access to one or more of the controlled access data files 120 within the protected LBA range of the non-volatile memory card 108.

When the authentication information received at the non-volatile memory card 108 is valid and is determined to enable access to the controlled access data files 120, data requested via a data request 112 may be returned from the non-volatile memory card 108 to the application 106 according to normal data read operations. However, when the authentication information provided to the non-volatile memory card 108 is invalid or otherwise insufficient to enable access to the set of controlled access data files 120, the non-volatile memory card 108 returns an indication 110 in response to the data request 112. When access is denied, in response to the requested data the indication 110 is provided that has an effect of instructing a host device to avoid a timeout when the data request 112 is denied, without providing the requested data. For example, the indication 110 may include information indicating a credential that is required to access the set of controlled access data files 120, other data indicating an authentication error occurred, or any other information that is suitable to serve as a sufficient reply to the data request 112 to prevent a host device from timing out the data request 112. As another example, the indication 110 may include American Standard Code for Information Interchange (ASCII) text including a failure message or a warning message to indicate a reason for the failure of the data request 112, such as an authentication failure message. As a further example, the indication 110 may include return data, such as zero data, that is communicated for instructing the host device to avoid a timeout when the data request 112 is denied. In a particular embodiment, when a "write to" operation is requested at an LBA range containing the protected area, a "write protection violation" indicator is returned if the write would change data stored in the protected area, and no "write" operation is performed. On the other hand, if the data to be written to the protected area is the same as the data already stored so that the write operation will not alter the stored data, the "write" operation is performed without returning an error indicator. In either case, there is no timeout situation at a host device.

Figure 2:
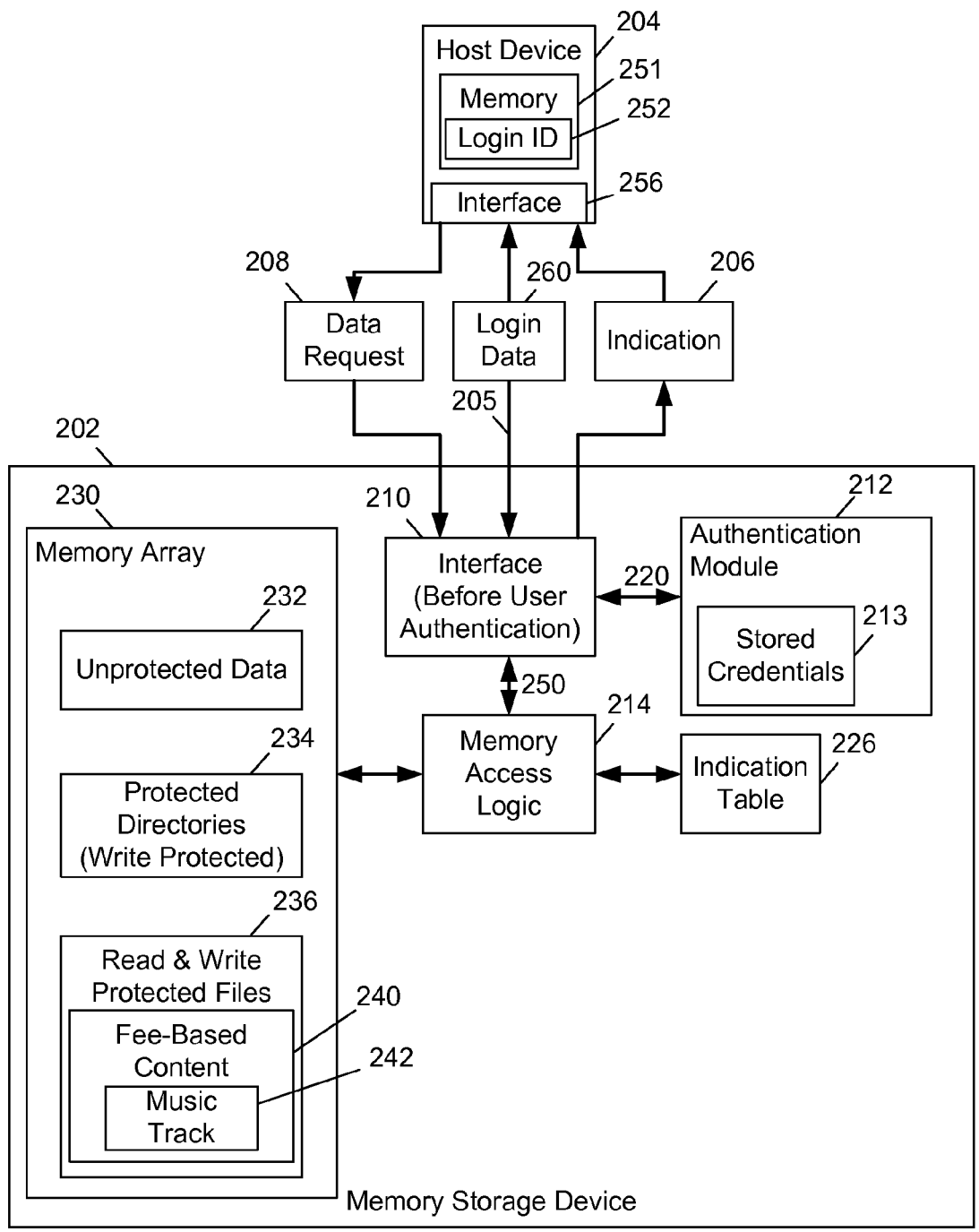
FIG. 2 is a block diagram of a second particular embodiment of a system to control data access to a non-volatile memory device.

Referring to FIG. 2, particular illustrative embodiment of a system to control data access to at least a portion of a non-volatile memory device is depicted and generally designated 200. The system 200 includes a memory storage device 202 coupled to a host device 204. The memory storage device 202 includes an interface 210, an authentication module 212 in communication with the interface 210, and memory access logic 214 coupled to the interface 210. A memory array 230 includes a data area to store data at the memory storage device 202. The memory array 230 includes unprotected data 232, protected directories 234, and read and write protected files 236. In an illustrative embodiment, the memory storage device 202 may be the non-volatile memory card 108 of FIG. 1.

In a particular embodiment, the host device 204 represents an external source of data requests or instructions external to the memory storage device 202. For example, the host device 204 may represent a computer or processor coupled to the memory storage device 202, such as via a physical connection or a wireless coupling. In a particular embodiment, the host device 204 is a wireless communication device that includes a subscriber identity module (SIM) card. The host device 204 may include an interface 256 that is configured to request a login for access to a set of one or more controlled access data files, such as the read and write protected files 236 stored at the memory array 230 of the memory storage device 202. The login request may include providing data 260 to request a login to the interface 210 via a channel 205 to be used for authentication. The channel 205 may be a secure channel.

The login request may include a login identifier 252 stored at a computer memory 251 of the host device 204. For example, the data 260 may include an international mobile subscriber identity (IMSI) from a SIM card, such as depicted in FIG. 1. The SIM may be operative to compute the data 260 or to perform a login process. As another example, the data 260 may include a network identifier to be used to unlock the read and write protected files 236. The read and write protected files 236 may be available to subscribers of a particular network, but unavailable to subscribers of other networks. As another example, the data 260 may include a telephone number, an international mobile equipment identity (IMEI), or a mobile station international subscriber directory number (MSISDN).

The interface 210 may be configured to receive the data 260 and provide the received data 260 to the authentication module 212 via a communication channel 220. The interface 210 may include one or more electrical connectors and may provide compatibility with one or more interface protocols or standards, such as Secure Digital™ (SD), CompactFlash™ (CF), Universal Serial BuS™ (USB), MultiMedia Card (MMC), and Memory Stick™ (MS). Other examples include personal computer memory card international association (PCMCIA) interface including a 16 bit standard PC Card interface and a 32 bit standard CardBus interface, an IEEE 1394 FireWire interface, a Small Computer System Interface (SCSI) interface, an Advance Technology Attachment (ATA) interface, a serial ATA interface, an Integrated Device Electronic (IDE) standard, an Enhanced Integrated Device Electronic (EIDE) standard, a Peripheral Component Interconnect (PCI) interface, a PCI Express interface, or a conventional serial or parallel interface, as illustrative, non-limiting examples. The interface 210 may include a controller, such as dedicated circuitry, one or more processors, or any combination thereof, that is operative to translate between physical layer signals and application specific messages.

The authentication module 212 may be implemented as hardware, firmware, or a combination of hardware and firmware. The authentication module 212 may be operable to perform a comparison of the received authentication data to one or more stored credentials 213. Where the authentication data received from the host device 204 is determined to match or substantially coincide to the stored credentials 213, thus indicating that the host device 204 is authorized for access to protected files at the memory array 230, the authentication module 212 may indicate to the interface 210 that such authorization is granted. Where the authentication data 205 is determined not to coincide with an authorized user of protected files at memory array 230, the authentication module 212 may communicate to the interface 210 that access to protected data is denied.

The authentication module 212 may include circuitry that is configured to receive authentication data, such as a password or other access code, via a data channel 220, and to verify the password or other access code. In a particular embodiment, the authentication data may be received as part of the data 260 to request a login sent by the interface 256 of the host device 204 via the secure channel 205. The authentication module 212 is configured to implement one or more standard authentication processes. For example, in a particular embodiment, the authentication module 212 may perform a comparison to match the received password to a control password or to the stored credentials 213 that may be hard-wired within or otherwise accessible to the authentication module 212. The authentication module 212 may include one or more comparison circuits, such as a content addressable memory (CAM) circuit as a particular example. Alternatively, or in addition, the authentication module 212 may include a processor that is programmed to perform an algorithm to receive the password, to access the control password or stored credentials, to compare the control password or credentials to the received password, and to generate an authentication result based on the comparison.

In another embodiment, the authentication module 212 may check a result of a calculation performed using the access code. The authentication module 212 may include one or more computation circuits, such as an adder or an arithmetic logic unit (ALU), to perform a calculation using the access code, coupled to a comparison circuit to check a result of the calculation by comparing the result to an expected result. Alternatively, or in addition, the authentication module 212 may include a processor that is programmed to perform an algorithm to receive the access code, to perform a calculation using the access code, to compare the result of the calculation with an expected value, and to generate an authentication result based on the comparison.

In a particular embodiment, the authentication module 212 includes circuitry that is configured to implement a challenge response process or a mutual authentication process. For example, the authentication module 212 may include hardware, firmware, or any combination thereof that is adapted to implement a symmetric key or secret key algorithm, an asymmetric key or public key algorithm, or other authentication process to verify authentication credentials. The authentication module 212 may also include circuitry that is configured to generate a response signal to indicate whether the received authentication data is verified as granting access. To illustrate, the authentication module 212 may implement dedicated hardware logic circuitry, such as combinations of AND gates and OR gates formed using metal-oxide-semiconductor field effect transistors (MOSFETs) coupled in a manner to implement a state machine that generates a challenge signal, that processes and compares data that is received in response to the challenge to an expected value, and that generates a response signal that indicates whether the authentication data is verified. Alternatively, or in addition, the authentication module 212 may include a processor that is programmed to perform an algorithm to generate the challenge, to process and compare data that is received in response to the challenge to an expected value, and to generate an authentication result based on the comparison.

In a particular embodiment, the grant or denial of access to one or more portions of protected data at the memory array 230 is enforced via the memory access logic 214. In a particular embodiment, a request to read or write data to the memory array 230 may be received from the host device 204 in the form of a data request 208. The interface 210 may be adapted to receive memory access requests to perform one or more operations on a selected portion of the memory array 230 indicated by the data request 208. Information regarding the data request 208 may be communicated to the memory access logic 214 via a communication channel 250. Where the data request 208 indicates a request to read or write data to a portion of the memory array 230 that is not controlled by a user authentication, such as the unprotected data 232, conventional read and write access to the unprotected data 232 is provided. However, where the data request 208 indicates a request to access protected data, such as the protected directories 234 or the read and write protected files 236, the memory access logic 214 may be operable to instruct the interface 210 to return an indication 206 that the data request 208 has failed.

For example, when the data request 208 requests access to protected data, such as the read and write protected files 236, which the host device 204 is not authorized to access, the memory storage device 202 may return an indication 206 that is communicated to the host device 204 to instruct the host device 204 to avoid a timeout when the memory request is denied. The indication 206 may include account information that may indicate to the host device 204 a particular account or type of account to which the host device 204 should subscribe in order to be authorized to access protected data at the memory storage device 202. For example, when the host device 204 has a selection among many sets of credentials to provide for authentication data 205, the indication 206 returned in response to an authorization failure may indicate an alternative set of credential data that may be enable access to data associated with the data request 208. The indication 206 may include a credential for authentication rather than account information. For example, the credential for authentication may include a description or a designator of a type of credential that would be approved by the authentication module 212 for authorization to access protected data at the memory array 230.

In other embodiments, the indication 206 may identify that the requested data is protected from access. For example, the indication 206 may include American Standard Code for Information Interchange (ASCII) text including a failure message or a warning message to indicate to the host device 204 a reason for the failure of the data request 208, such as an authentication failure message. As another example, the indication 206 may include return data of at least a particular size that is set for preventing a timeout at the host device 204 in response the data request 208.

For example, the host device 204 may be configured to send the data request 208, and to consider the data request 208 as timed out for failure to receive a response of a particular size or containing a particular content in response to the data request 208. The host device 204 may consider that a failure to receive a positive result of the data request 208 within a predetermined time period may be due to communication failure, as opposed to an authorization failure, and may continually attempt to resend the data request 208, or may prevent any further requests to access memory storage device 202. By providing an indication 206 having a data size that is set for preventing the timeout at the host device 204, future continual or repeated data requests 208 may be prevented, and the host device 204 may instead perform other actions in response to the indication 206. In yet another example, the indication 206 may include a set of data that may correspond to at least a minimum size of data expected by the host device 204 in response to the data request 208, however, the data provided and the indication 206 may be all zero values, or all one values, or some other combination of values that may be recognized as a valid response to the data request 208 by the host device 204, without including actual content of protected data files to unauthorized device 204.

In a particular embodiment, where the memory storage device 202 may be selectively coupled to one or more host devices 204, the memory access logic 214 may be configured to access an indication table 226 to generate an indication 206 in response to a particular data request 208 from a specific host device 204. When the host device 204 provides authentication data 205 indicating a first type of host device or network access, the memory access logic 214 may identify a corresponding entry in the indication table 226 in order to generate an indication 206 that will prevent a timeout at the host device 204. As an example, a first type of host device 204 may expect to receive at least an eight-byte response from the memory storage device 202 in response to the data request 208. The indication 206 may be determined to be an eight-byte response of all zero data or a response of all zero data that matches a response data size requested by the host, as determined via lookup at the indication table 226 for the host device 204. However, another host device 204 may instead not recognize a specified size of zero data as a valid response to the data request 208 sufficient to prevent a timeout at the host device 204, and may instead require a specific ASCII message from the memory storage device 202 in order to prevent a timeout. In this particular example, the memory access logic 214 may access the indication table 226 to retrieve the particular ASCII message, and the indication 206 may be generated and transmitted to the host device 204 including the ASCII message to prevent a timeout at the host device 204.

In this manner, the memory storage device 202 may be operative to allow the host device 204 to have unrestricted access to portions of the memory array 230 such as the unprotected data 232. In addition, the memory storage device 202 may be operative to restrict access to protected portions of the memory array 230 to only authorized devices 204. One or more security policies restricting access to the protected directories 234 and to the read and write protected files 236 may be enforced via the authentication module 212 and the memory access logic 214. For example, where the host device 204 does not provide proper authentication data 205, the data request 208 to modify the protected directories 234 or to read or write the protected files 236 may be refused, with an indication 206 provided in return to the host device 204 to enable intelligent error handling and prevent a timeout at the host device 204.

In addition, one or more layers of authentication may be implemented at the memory storage device 202. For example, when the host device 204 provides authentication data via the channel 205 that enables access to the read and write protected files 236, content within the read and write protected files 236 may require additional authentication. In particular, fee-based content 240 may require a user to pay a fee to have access to the fee-based content 240. As illustrated, the fee-based content 240 includes one or more music tracks, such as a representative music track 242. In addition to authenticating that the host device 204 has access to the read and write protected files 236, the authentication module 212 may further store credentials to authenticate that a user associated with the host device 204 has paid an appropriate fee to access the fee-based content 240, such as the representative music track 242. The memory storage device 202 may enforce a digital rights management (DRM) scheme to enable a limited number of read or write accesses to a range of LBAs, such as the representative music track 242.

For example, a DRM scheme may enable limited access to an associated range of LBAs. The memory access logic 214 may be configured to enforce access control to the associated range of LBAs according to the DRM scheme. In a particular embodiment, the DRM scheme may limit a number of read accesses to the LBA range. In a particular embodiment, the DRM scheme may limit a number of write accesses to control how many times data can be written to the protected area. For example, the DRM scheme may limit a number of updates of an advertisement that is stored at the protected area.

Figure 3:
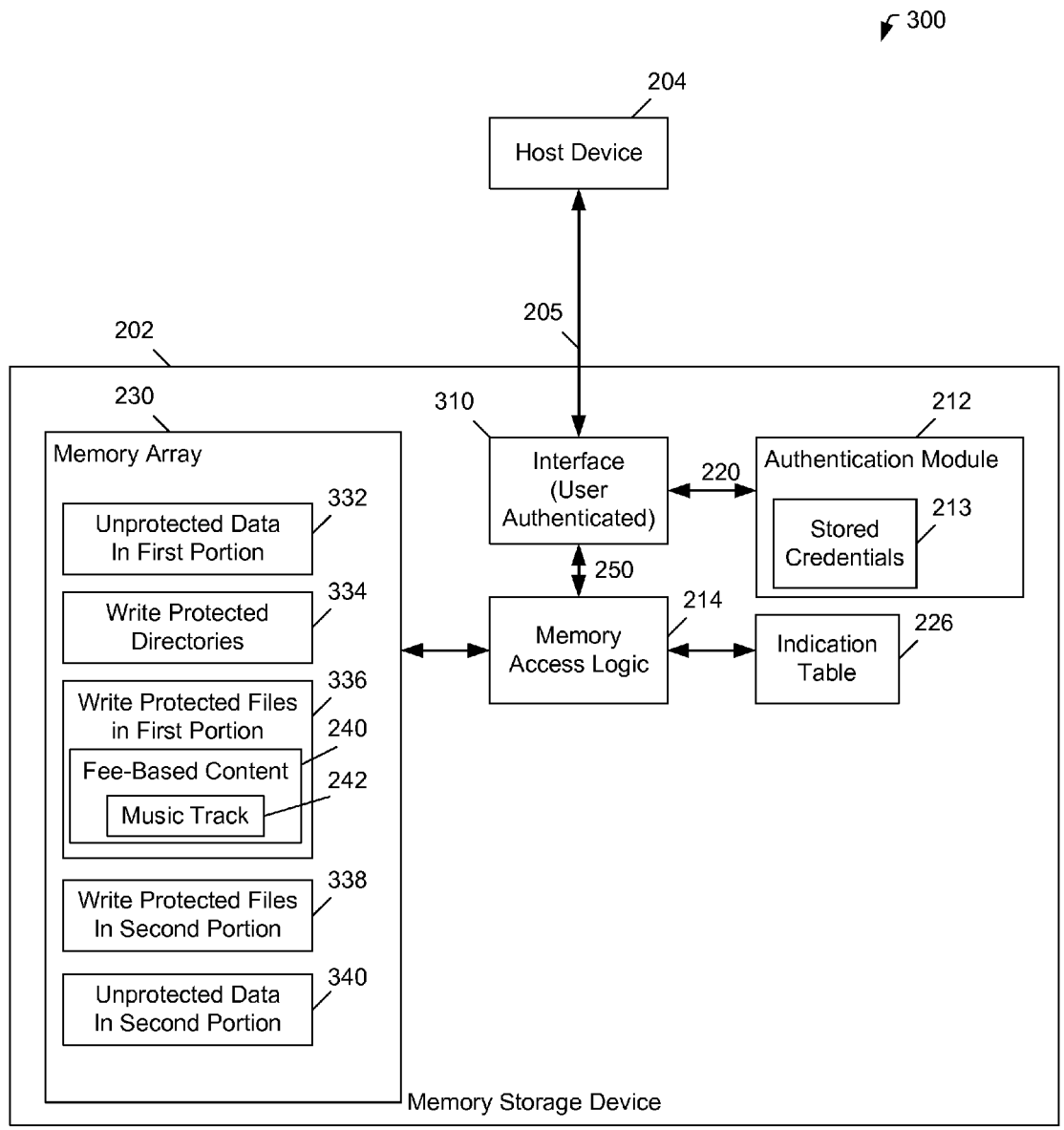
FIG. 3 is a block diagram of a particular embodiment of the system of FIG. 2 after authentication to access data at a non-volatile memory has been performed.

FIG. 3 depicts a system 300 including the host device 204 and the memory storage device 202 of FIG. 2 after the host device 204 has been authenticated. The host device 204 communicates with the memory storage device 202 via a user interface 310, where the host device 204 is authenticated using authentication data provided via the channel 205. The memory storage device 202 includes the authentication module 212 and the stored credentials 213 in communication with the user interface 310 via the data channel 220. The memory access logic 214 has access to the indication table 226 and to the memory array 230, and can communicate with the user interface 310 via the data channel 250.

As depicted in FIG. 3, after the host device 204 has provided a proper authentication, the memory array 230 includes unprotected data in a first portion 332, write protected directories 334, write protected files in the first portion 336, write protected files in a second portion 338, and unprotected data in the second portion 340. In a particular embodiment, the first portion may correspond to a first partition of the memory array 230, and the second portion may correspond to a second partition. In other embodiments, the first portion and the second portion may correspond to regions of the memory array 230, such as address ranges associated with various security levels. For example, protected data in the first portion may be available to hosts providing a first credential, while protected data in the second portion may be available to hosts providing a second credential.

In a particular embodiment, the unprotected data in the first portion 332 may correspond to the unprotected data 232 that was accessible without an authentication of the host device 204. The write protected directories 334 may correspond to the protected directories 234 of FIG. 2, indicating that even with proper authentication, the host device 204 does not have write access to the write protected directories 334. The write protected files in the first portion 336 may correspond to the read and write protected files 236 of FIG. 2, with the authentication of the host device 204 removing the read restriction of the read and write protected files 236, while continuing to enforce write protection to prevent write access to the write protected files 336. The write protected files in the first portion 336 may include the fee-based content 240 and the representative music track 242 depicted and described with respect to FIG. 2. Similarly, the second portion may also include the write protected files 338 that may formerly have been read controlled, meaning that prior to authentication the protected files 338 were not readable and were not modifiable by the host device 204, and after authentication, the files are made available for reading but remain write protected. As used herein, the term "write protected" may also indicate a restriction on removing, deleting, or otherwise making inaccessible by the host device 204. The unprotected data in the second portion 340 may correspond to data that was previously unprotected prior to authentication or data that was previously protected and is currently available for reading and writing following authentication, or any combination thereof.

Data that is made available as a result of a successful authentication may remain available on a temporary basis or on a permanent basis. Content that is temporarily enabled remains available while an authenticated host remains logged in and becomes unavailable after a logout event. Content that is permanently enabled, once the content is made available via a successful authentication, remains available even after a logout event or a card power cycle. For example, content that is permanently enabled may remain available even after a removal and re-insertion event.

Though various components of the memory storage device 202 depicted in FIGS. 2-3 are illustrated as block components and described in general terms, such components may include one or more microprocessors, state machines, other digital logic circuits configured to enable the memory storage device 202 to perform the particular functions attributed to such components, or any combination thereof. For example, the interface 210, the authentication module 212, and the memory access logic 214 may represent physical components, such as controllers, state machines, logic circuits, or other structures to enable the memory storage device 202 to receive and respond to data requests from the host device or other external devices based at least partially on an authorization of the external device to access protected portions of the memory array 230.

For example, the interface 210 may include a microprocessor or microcontroller programmed to receive authentication data from a host device and to provide the authentication data to the authentication module 212, to receive memory access requests to perform one or more operations on a selected portion of the memory array 230, and to communicate to a host device an indication that a memory request to a selected portion of the memory array 230 is denied, the indication being communicated for instructing the host device to avoid a timeout when the memory request is denied. In a particular embodiment, the interface 210 includes a processor, and executable instructions that are executed by the processor are stored at the memory array 230. Alternatively, or in addition, executable instructions that are executed the processor included in the interface 210 may be stored at a separate memory location that is not part of the memory array 230, such as at a read-only memory (ROM) (not shown) that is accessible to the interface 210. The authentication module 212 may include a microprocessor or microcontroller programmed to access stored credentials to validate authorization to access a selected portion of the memory array 230, the selected portion of the memory array identified by one or more logical addresses within a protected portion. For example, the authentication module 212 may include a processor programmed to receive authentication information via the interface 210, to perform a lookup or comparison operation at a table of stored credentials, and to generate a result of the lookup or comparison operation that indicates an access of the provider of the authentication information to protected portions of data stored at the memory array 230. In a particular embodiment, the authentication module 212 includes a processor, and executable instructions that are executed by the processor are stored at the memory array 230. Alternatively, or in addition, executable instructions that are executed the processor included in the authentication module 212 may be stored at a separate memory location that is not part of the memory array 230, such as at a ROM (not shown) that is accessible to the authentication module 212.

The memory access logic 214 may include a microprocessor or microcontroller programmed to receive memory access requests and to selectively grant or deny read access, write access, or any combination thereof, to portions of the memory array 230, based on an authorization of the requestor. For example, the memory access logic 214 may be responsive to the authentication module 212 to selectively prevent modification to at least one entry of a file allocation table to control write access to at least one of a set of controlled access data files, as will be discussed with respect to FIG. 4. In a particular embodiment, the memory access logic 214 includes a processor, and executable instructions that are executed by the processor are stored at the memory array 230. Alternatively, or in addition, executable instructions that are executed by the processor included in the memory access logic 214 may be stored at a separate memory location that is not part of the memory array 230, such as at a ROM (not shown) that is accessible to the authentication memory access logic 214. In a particular embodiment, the interface 210, the authentication module 212, the memory access logic 214, or any combination thereof, may be implemented via executable instructions accessible to a single processor or controller and operative to configure the single processor or controller to execute in accordance with the described functionality of the respective logic elements or modules 210, 212, 214, or any combination thereof. In another embodiment, two or more of the interface 210, the authentication module 212, the memory access logic 214, or any combination thereof, may be implemented separately from each other, such as using separated dedicated hardware or separate microprocessors or microcontrollers.

In a particular embodiment, the memory storage device 202 may be a portable device configured to be selectively coupled to one or more external devices. However, in other embodiments, the memory storage device 202 may be attached or embedded within one or more host devices, such as within a housing of a portable communication device. For example, the memory storage device 202 may be within a packaged apparatus such as a wireless telephone, personal digital assistant (PDA), gaming device or console, other devices that use internal non-volatile memories such as flash memories, or any combination thereof.

Figure 4:
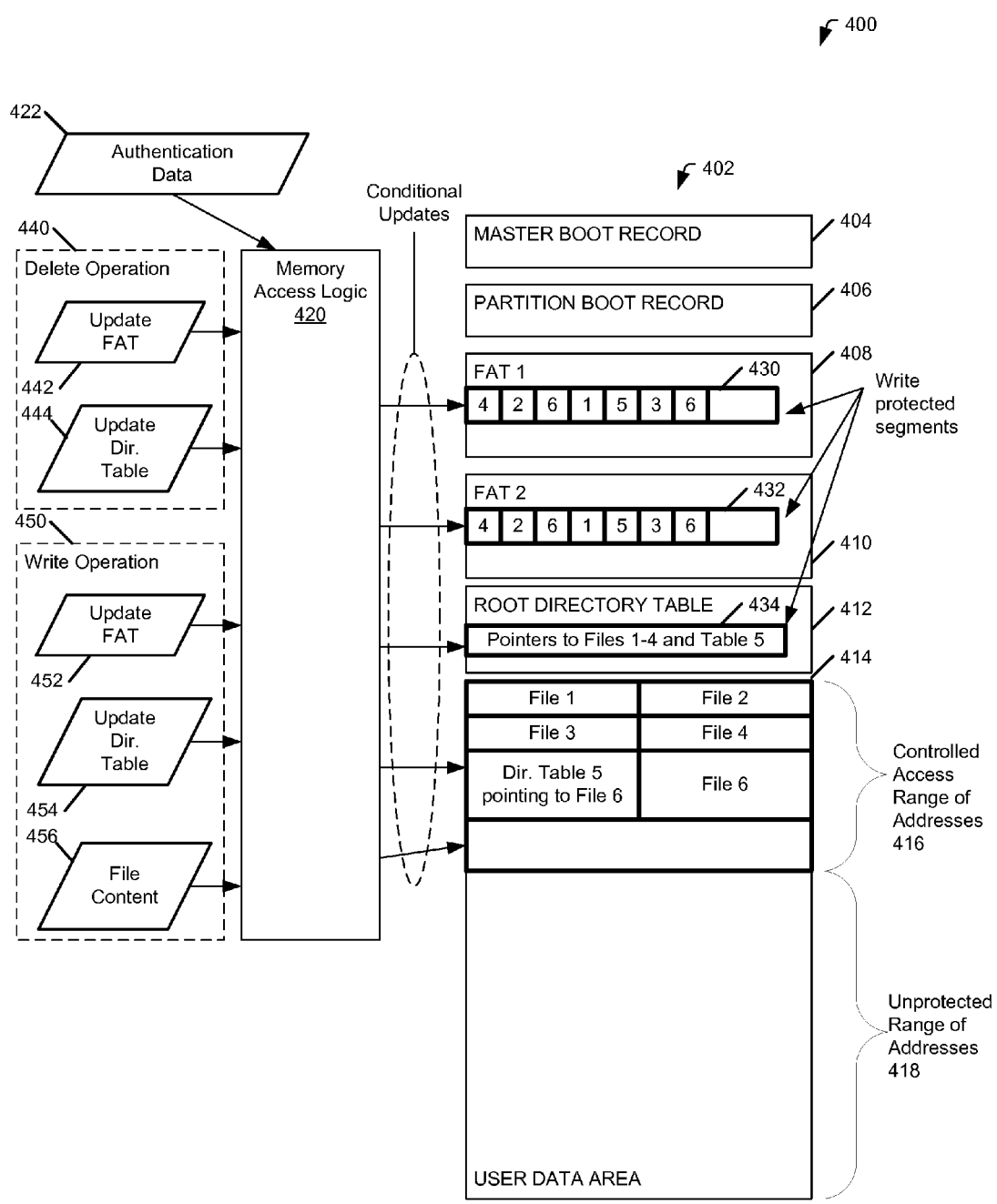
FIG. 4 is a block diagram of a third particular embodiment of a system to control data access to a non-volatile memory device.

Referring to FIG. 4, a particular illustrative embodiment of a system to provide selective file access control in a nonvolatile memory is depicted and generally designated 400. The system 400 includes a memory array 402 that is accessible by memory access logic 420. The memory access logic 420 is responsive to authentication data 422 that may be received from an external device. In a particular embodiment, the memory array 402 may correspond to the memory array 230 of FIGS. 2-3. In an illustrative embodiment, the memory access logic 420 may correspond to the memory access logic 214 of FIGS. 2-3.

The memory array 402 includes a master boot record 404, a partition boot record 406, a first file allocation table (FAT 1) 408, a second file allocation table (FAT 2) 410, a root directory table 412, and a data area 414. The data area 414 may include a controlled access range of addresses 416, illustrated as data elements having thickened borders within the data area 414, and including a first file (File 1), a second file (File 2), a third file (File 3), a fourth file (File 4), a directory table (Dir. Table 5) including a pointer to a sixth file, the sixth file (File 6), and additional protected addresses following the sixth file. A normal access range of addresses 418 is illustrated as not containing any files, however, one or more data files or sets of data files may be stored in the normal range of addresses 418 and may be modifiable, writable, and removable via normal read/write operations.

In a particular embodiment, the protected files and directory table in the controlled access range of addresses 416 may be stored to the memory array 402 in a set of continuous addresses, such as a set of contiguous logical addresses. Access to the controlled access data may be selectively controlled by preventing write operations at the file allocation tables 408 and 410 and at the root directory table 412. For example, the first file allocation table 408 includes a write protected portion 430 that indicates memory locations corresponding to the illustrated files within the controlled access range of addresses 416. For example, the first entry in the write protected portion of the first FAT 408 associates a first cluster to File 4, a second cluster to File 2, a third cluster to File 6, a fourth cluster to File 1, a fifth cluster to the directory table 5, a sixth cluster to File 3, and a seventh cluster to File 6.

In a particular embodiment, the write protected portion 430 of the file allocation table 408 extends to cover one or more entire segments of the file allocation table 408. Where, as illustrated, a number of clusters associated with protected files is insufficient to fill an entire segment of the first FAT 408, dummy end-of-file cluster entries may replace the empty cluster entries in the controlled access range of addresses 416 to fill the first FAT 408 to a segment border. By filling the write protected segment 430 in the first FAT 408 with dummy end-of-file entries, write instructions to write data to the memory array 402 will not identify an empty portion of the write protected segment 430 of the file allocation table 408 as free for a data write operation. Alternatively, or additionally, one or more dummy files may be created to have a size sufficient to fill the remainder of the protected segment 430 of the first FAT 408. In another embodiment, such as when a host operating system performs reads and writes to eight sectors of the first FAT 408 at a time, end-of-file entries or dummy files, or both, may be created to fill the remainder of the protected segment 430 and to also fill to a next eight-sector boundary within the first FAT 408.

In a particular embodiment, where the controlled access range of addresses 416 indicate a contiguous section of the memory array 402 beginning at a first available data portion of the memory array 402, the write protected portion 430 of the first FAT 408 will continuously extend from a first FAT entry to a last continuous FAT entry to be write protected, including one or more dummy files added to maintain an integer number of segments in the write protected portion 430. Therefore, write operations are restricted from occurring in the controlled access range of addresses 416, and may only occur within the normal access range of addresses 418. The second FAT 410 may store redundant information to the first FAT 408 including a redundant write protected segment 432, duplicating data stored at the write protected segment 430 of the first FAT 408.

In a particular embodiment, the root directory table 412 also includes one or more write protected segments 434. As illustrated, the write protected segment 434 of the root directory table 412 includes pointers to File 1 through File 4 and also a pointer to directory table 5. For example, the pointers to Files 1 to 4 may include data indicating FAT entries corresponding to a beginning storage cluster of each of the Files 1, 2, 3, and 4 and also corresponding to a beginning cluster location of directory table 5. Since the file entries may not fill the root directory to a whole sector, in one embodiment, dummy files may be added to the root directory to fill the last sector of the root directory. In another embodiment, such as when a host performs reads or writes to the root director table 412 eight sectors at a time, dummy files may be added to fill to a next eight-sector boundary.

Similarly, the directory table 5 may include a write protected portion that may include dummy files to fill the write protected portion to a next sector boundary, or to a next group of sectors boundary, such as a next eight-sector boundary. The first FAT 430 pre-allocates a size of the directory table 5 as a multiple of the cluster size. The directory table 5 may be pre-allocated to have two clusters, which may correspond to 128 sectors in a particular implementation, to enable a user to create an appropriate number of unprotected files in the folder.

In a particular embodiment, the memory access logic 420 is operative to control access to selected portions of the user data area 414 at least partially by controlling access to the first and second FAT 408 and 410 and the directory tables, such as the root directory table 412 and the directory table 5. For example, a delete operation 440 is illustrated as being provided to the memory access logic 420. The delete operation 440 includes two instructions to be performed at the memory array 402 to effect a file deletion, including an update FAT instruction 442 to update the file allocation tables to show that one or more clusters associated with the file to be deleted are now available for re-use, and an update directory table instruction 444 to perform a write operation to indicate that the deleted file is no longer stored in its parent directory. Upon receipt of the update FAT instruction 442, the update directory table instruction 444, or any combination thereof, the memory access logic 420 may be configured to selectively prevent or allow the instructions 442 and 444 to be effected at the memory array 402, illustrated as conditional updates in FIG. 4 accessing the first and second FAT 408 and 410, the root directory table 412, the directory 5 table, and a protected area of free space or dummy files within the controlled access range of addresses 416.

A write operation 450 may also be received at the memory access logic 420. The write operation may include an update FAT instruction 452, an update directory table instruction 454, and a file content instruction 456 to update a file content that is stored in the user data area 414. Upon receiving the write operation 450, the memory access logic 420 may selectively prevent modification to at least one entry of the first or second FAT 408, 410 to control a write access to at least one of the first set of controlled access data files, illustrated as Files 1 through 4 and File 6, and directory table 5. The memory access logic 420 may also selectively prevent modification to at least one entry in a directory table, such as the root directory table 412, to control a write access to at least one of the first set of controlled access data files.

In a particular embodiment, a host device providing the write operation instruction 450 may receive an indication that one or more of the update FAT instruction 452 or the update directory table instruction 454 have failed, and in response may not provide the file content instruction 456. However, the memory access logic 420 may also be configured to selectively prevent the file content instruction 456 to control writing of data within the controlled access range of addresses 416.

In a particular embodiment, although the user data area 414 is illustrated as including a controlled access range of addresses 416 and a normal access range of addresses 418, the memory array 402 and the memory access logic 420 may be implemented in a memory device that does not include an internal file system control table to control read and write protection of files at the user data area 414. Instead, file read and write protections may be implemented via a control table of a file system of a host device coupled to the external memory device.

Although illustrated for simplicity as a single functional logic element, the memory access logic 420 may include circuitry, state machines, processors, controllers, or any combination thereof, configured or programmed to operate as described herein. In a particular embodiment, the memory access logic 420 may be implemented as a microprocessor programmed to perform interface operations such as to receive authentication data from a host device, to receive memory access requests to perform one or more operations on a selected portion of the memory array 402, and to communicate to a host device an indication that a memory request to a selected portion of the memory array 402 is denied. The microprocessor may be programmed to perform one or more authentication operations such as to access stored credentials to validate authorization to access a selected portion of the memory array 402, for example by performing a lookup or comparison operation at a table of stored credentials, and to generate a result of the lookup or comparison operation that indicates an access of the provider of the authentication information to protected portions of data stored at the memory array 402. The microprocessor may be programmed to receive memory access requests and to selectively grant or deny read access, write access, or any combination thereof, to portions of the memory array 402, based on an authorization of the requester. For example, the memory access logic 402 may selectively prevent modification to at least one entry of a file allocation table 408 or 410 or to a directory table such as the root directory table 412 to control write access to at least one of a set of controlled access data files, such as Files 1-4 and File 6.

Figure 5:
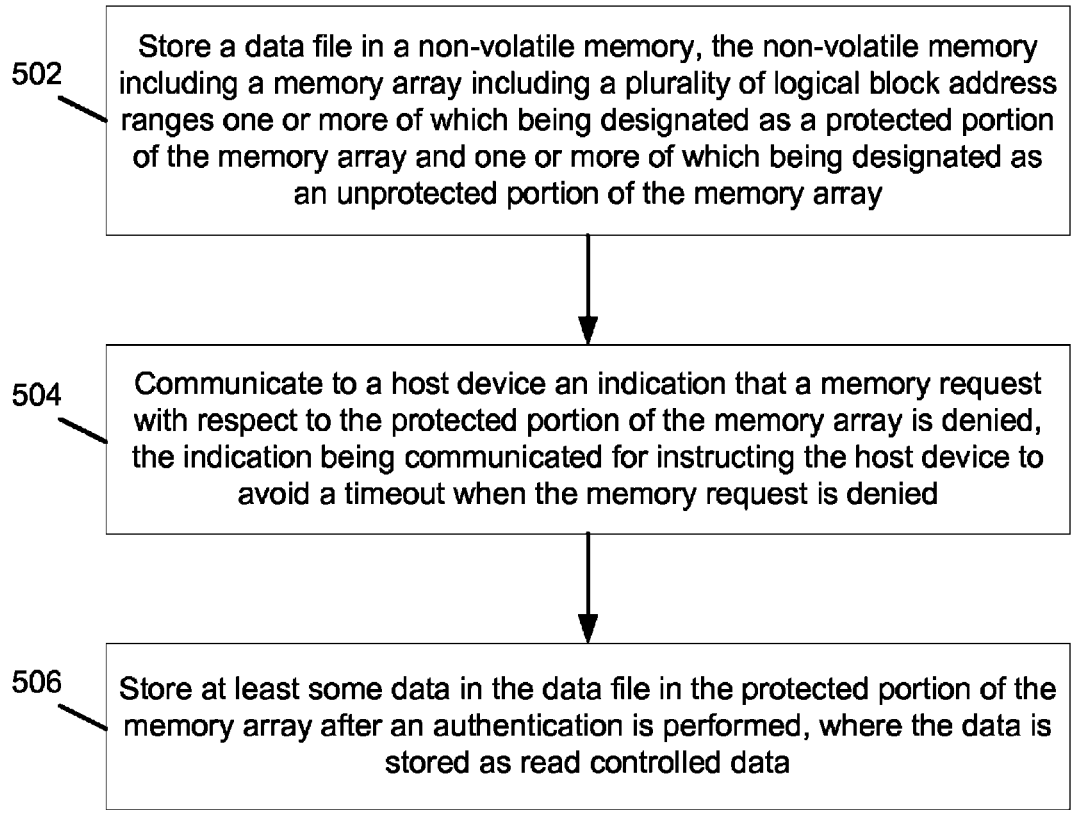
FIG. 5 is a flow diagram of a particular embodiment of a method to control data access to a non-volatile memory.

Referring to FIG. 5, a particular embodiment of a method to control data access to a non-volatile memory is depicted. At 502, a data file is stored in a non-volatile memory. The non-volatile memory includes a memory array including a plurality of logical block address ranges one or more of which corresponding to a protected portion of the memory array and one or more of which corresponding to an unprotected portion of the memory array. For example, a logical block address range may correspond to a portion of the memory array that stores data that is protected from access. In another embodiment, a logical byte address range corresponds to the portion of the memory array that stores data that is protected from access. The data stored at the protected portion of the memory array may be protected from access by preventing a translation of a logical block address (LBA) within the LBA range to a physical address, by protecting access to data stored at the memory array at physical addresses that map to the LBA range, by encrypting data stored at the physical addresses that map to the LBA range, by monitoring the data changes in the protected area, by other techniques, or any combination thereof. In an illustrative embodiment, the non-volatile memory may be the non-volatile memory card 108 depicted in FIG. 1, the memory storage device 202 depicted in FIGS. 2-3, or may include the memory access logic 420 or the memory array 402 depicted in FIG. 4, or any combination thereof.

In a particular embodiment, at least some data in the data file includes music tracks that can be accessed after a user pays a fee. The data file may be controlled with digital rights management to be read a limited number of times.

Proceeding to 504, an indication is communicated to a host device that a memory request with respect to the protected portion of the memory array is denied. The indication is communicated for instructing the host device to avoid a timeout when the memory request is denied.

Continuing to 506, in a particular embodiment, at least some data in the data file is stored in the protected portion of the memory array after an authentication is performed. The at least some data may be stored as read controlled data. For example, the read controlled data may not be read or written prior to authentication, and may remain write protected after authentication.

Figure 6:
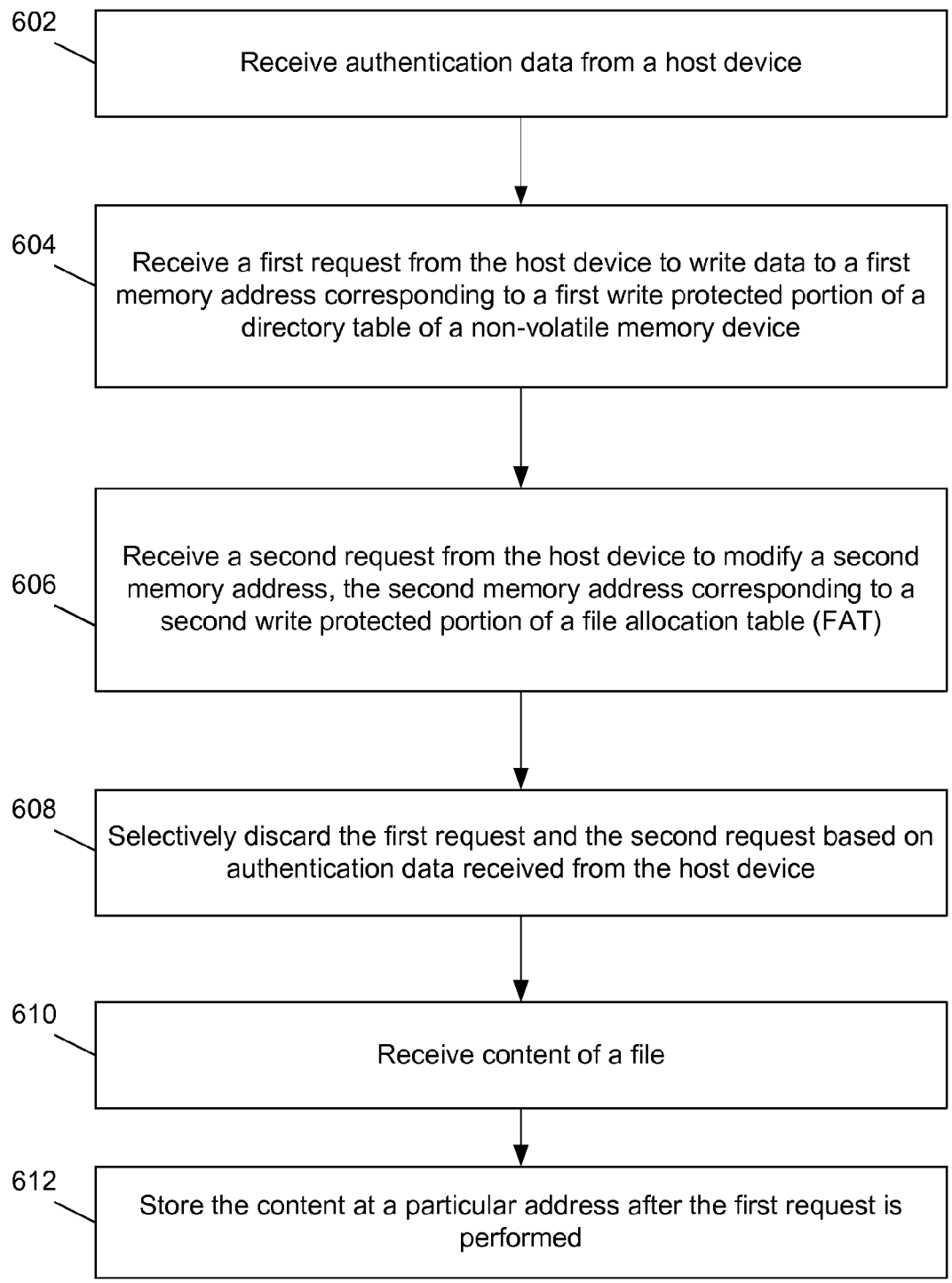
FIG. 6 is a flow diagram of a second embodiment of a method to control data access to a non-volatile memory.

Referring to FIG. 6, a flow diagram of a second embodiment of a method to control data access to a non-volatile memory is depicted. At 602, authentication data is received from a host device. For example, the host device may be the host device 204 depicted in FIGS. 2-3. The authentication data may include one or more credentials or other information to be evaluated to determine authorization to access protected content at a memory device. For example, the authentication data may include Subscriber Identity Module (SIM) information, International Mobile Subscriber Identity (IMSI) data, a network identifier, a phone number, an international mobile equipment identity (IMEI), a mobile station international subscriber director number (MSISDN), other authentication data, or any combination thereof.

Continuing to 604, a first request is received from the host device to write data to a non-volatile memory device. The non-volatile memory device includes a directory table having a first write protected portion and also includes a file allocation table (FAT) having a second write protected portion. The first request includes a request to write data to a first memory address corresponding to the first write protected portion of the directory table.

Advancing to 606, a second request is received from the host device to modify a second memory address of the non-volatile memory. The second memory address corresponding to the second write protected portion of the file allocation table (FAT). Moving to 608, the first request and the second request are selectively discarded based on the authentication data received from the host device.

For example, the first request and the second request may correspond to a delete operation to be performed on a file having a particular memory address that is within a controlled access range of memory addresses designated by the host device.

As another example, the first request and the second request may correspond to a write operation to write a file to a particular address. Content of the file may be received, at 610, and content may be stored at the particular address at 612. Storing the content may be performed after the first request is performed. For example, when the first request is discarded, the content may not be subsequently stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. Accordingly, the disclosure and the figures are to be regarded as illustrative rather than restrictive.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-volatile data storage device comprising:
   a memory array to store data, the memory array including a plurality of address ranges one or more of which corresponding to a protected portion of the memory array and one or more of which corresponding to an unprotected portion of the memory array;
   an authentication module adapted to access stored credentials to validate authorization to access a selected portion of the memory array, the selected portion identified by one or more addresses within the protected portion; and
   an interface adapted to receive memory access requests to perform one or more operations on the selected portion of the memory array;
   wherein the interface is further adapted to communicate to a host device an indication that a memory access request to the selected portion of the memory array is denied, wherein the indication is communicated to instruct the host device to avoid a timeout when the memory access request is denied, wherein the indication is determined based on a type of the host device, and
   wherein the interface is further adapted to refrain from communicating to the host device the indication that the memory access request is denied when the memory access request would not alter data previously stored in the protected portion of the memory array.

2. The device of claim 1, wherein the indication includes account information indicating an account that is authorized to access the protected portion of the memory array.

3. The device of claim 1, wherein the indication identifies an alternative credential that is authorized to access the protected portion of the memory array.

4. The device of claim 1, wherein the indication identifies that requested data is protected from access.

5. The device of claim 1, wherein the indication includes American Standard Code for Information Interchange (ASCII) text or zero data.

6. The device of claim 1, wherein the indication has a data size that is selected such that the host device does not timeout in response to the indication.

7. The device of claim 1, wherein the indication is selected from a table based on the type of the host device, wherein the table stores a plurality of indications corresponding to a plurality of host types.

8. The device of claim 1, wherein data in the protected portion is controlled with digital rights management to be written a limited number of times.

9. The device of claim 8, wherein the data controlled with digital rights management is associated with an advertisement.

10. The device of claim 1, wherein the memory array further includes a set of one or more controlled access data files corresponding to a first set of contiguous logical addresses within the protected portion of the memory array, wherein the memory array includes a partition, and wherein the set of one or more controlled access data files and the unprotected portion are located within the partition.

11. The device of claim 10, wherein at least some of the data in the set of one or more controlled access data files includes content that is accessible in a read only mode after a user pays a fee to receive access to the content.

12. The device of claim 11, wherein the content includes at least one music track.

13. The device of claim 10, wherein the host device comprises a wireless device and wherein a request is received by the interface from the wireless device to request a login for access to the set of one or more controlled access data files.

14. The device of claim 13, wherein the request is received from a subscriber identity module (SIM) card of the wireless device.

15. The device of claim 13, wherein the request received by the interface includes an International Mobile Subscriber Identity (IMSI) of the wireless device.

16. The device of claim 13, wherein the request received by the interface includes a network identifier associated with a particular network to which a user of the wireless device is subscribed, and wherein the network identifier is usable to unlock the set of one or more controlled access data files.

17. The device of claim 13, wherein the request received by the interface includes a phone number of the wireless device, an international mobile equipment identity (IMEI) of the wireless device, or a mobile station international subscriber directory number (MSISDN) of the wireless device.

18. The device of claim 1, wherein the plurality of address ranges includes logical block address (LBA) ranges.

19. A method comprising:
at a data storage device coupled to a host device, performing:
storing a data file in a non-volatile memory of the data storage device, the non-volatile memory including a memory array including a plurality of logical block address ranges one or more of which corresponding to a protected portion of the memory array and one or more of corresponding to an unprotected portion of the memory array;
determining whether a memory access request with respect to the protected portion of the memory array would alter data previously stored in the protected portion of the memory array;
when the memory access request would alter the data previously stored in the protected portion of the memory array, communicating to the host device an indication that the memory request is denied, wherein the indication is communicated to instruct the host device to avoid a timeout when the memory request is denied, and wherein the indication is determined based on a type of the host device; and
when the memory access request would not alter the data previously stored in the protected portion of the memory array, refraining from communicating to the host device that the memory access request is denied.

20. The method of claim 19, further comprising storing at least some data in the data file in the protected portion of the memory array after an authentication is performed, wherein the at least some data is stored as read controlled data.

21. The method of claim 19, wherein at least some data in the data file includes music tracks that can be accessed after a user pays a fee.

22. The method of claim 19, further comprising selecting the indication from a table based on the type of the host device, wherein the table stores a plurality of indications corresponding to a plurality of host types.

23. A method comprising:
at a data storage device coupled to a host device, performing:
receiving authentication data from the host device;
receiving input indicating an operation to be performed at a non-volatile memory of the data storage device, wherein the input includes a first request to write data to a first memory address corresponding to a first write protected portion of a directory table that is stored in the non-volatile memory and that indicates pointers to protected files, and wherein the input includes a second request to modify a second memory address corresponding to a second write protected portion of a file allocation table (FAT) that is stored in the non-volatile memory and that indicates clusters associated with the protected files; and
when the authentication data does not match a stored credential, discarding the first request and the second request.

24. The method of claim 23, wherein the operation comprises a delete operation to be performed on a file having a particular memory address that is within a controlled access range of memory addresses designated by the host device.

25. The method of claim 23, wherein the operation comprises a write operation to write a file to a particular address, and further comprising, when the authentication data matches the stored credential:
receiving content of the file; and
storing the content at the particular address, wherein storing the content is performed after the first request is performed.

26. The device of claim 1, wherein the memory array stores a first protected portion and a second protected portion, wherein the first protected portion is readable in response to a first credential, and wherein the second protected portion is readable in response to a second credential.

27. The method of claim 23, wherein the non-volatile memory stores a second FAT storing data that is a duplicate of data stored in the FAT.

* * * * *